Aug. 18, 1953  H. HOPKES  2,648,851

SPRING STRIP FOR CONNECTING SPRINGS INTO GROUPS

Filed May 25, 1949

INVENTOR.
Henry Hopkes.
BY
Harness, Dickey & Pierce
ATTORNEYS.

Patented Aug. 18, 1953

2,648,851

UNITED STATES PATENT OFFICE 2,648,851

SPRING STRIP FOR CONNECTING SPRINGS INTO GROUPS

Henry Hopkes, Grosse Pointe, Mich., assignor to No-Sag Spring Company, Warren Township, Mich., a corporation of Michigan Application May 25, 1949, Serial No. 95,328

2 Claims. (Cl. 5—267)

This invention relates to spring construction and more particularly to a novel spring strip for connecting and spacing the springs of an assembly in predetermined relationship with respect to each other.

Heretofore in the art it has been the practice to either secure all of the springs of an assembly relative to each other by means of hog rings which are clamped about the springs or by means of helical or spiral spring strips which are turned and fed into engagement with adjacent springs so as to hold the springs in a predetermined relationship. Neither of these practices has proved entirely satisfactory and neither results in the advantages obtained by the use of this invention.

In practicing this invention, the aforementioned practices are eliminated by forming a wire strip into a zigzag formation, positioning the same adjacent the springs of an assembly, and then clinching certain of the opposed loops over the convolutions of the adjacent springs. The strip not only retains the springs in position, but provides a continuous top surface, while retaining the resiliency of the springs, which may assume a predetermined desirable contour when loaded.

The principal objects of this invention are to provide a sinuous wire strip formed in a zigzag shape, with the outer portions of certain of the convolutions thereof extending angularly away from the plane of the convolutions so as to be adapted to be clinched over the convolutions of adjacent springs of a spring assembly; to provide a zigzag spring strip of the aforementioned type which may be used for both connecting adjacent coil springs as well as adjacent zigzag type springs; to provide spring strips of the aforementioned type which may be easily connected to the springs of an assembly so as to resiliently interconnect such springs; and to provide generally a spring strip of the aforementioned type which is inexpensive to manufacture, rugged in construction and which will permit the springs of a spring assembly to be maintained in a predetermined relationship in as simple and inexpensive a manner as possible.

These and other objects of the invention will become apparent from the following detailed description taken in conjunction with the accompanying drawing in which.

Figure 1:
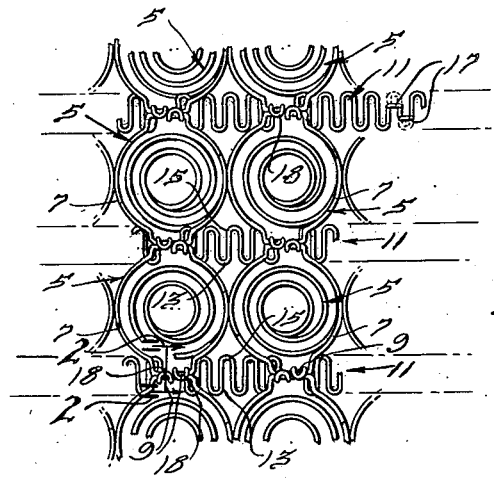
Figure 1 is an elevational view illustrating a plurality of coil springs interconnected by a spring strip of this invention.
Figure 2:
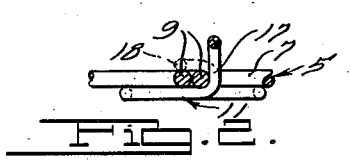
Fig. 2 is an enlarged view partially in section and partially in elevation of the structure illustrated in Fig. 1, taken along the line 2—2 thereof.

Referring now to the drawing and more particularly to Figs. 1 and 2, a plurality of rows of adjacent coil springs 5 are illustrated which may form part of a seat cushion or the like. The upper convolutions 7 of the coil springs 5 are provided with opposed offset flat portions 9, and the flat portions of the springs in each row abut the flat portions of the springs in the adjacent row when the springs are arranged in an assembly as shown. In order to maintain the coil springs 5 in this relationship, a sinuous spring wire strip 11 is extended beneath the flat portions 9 of the upper convolutions of the adjacent rows of coil springs 5. The spring strip 11 is of the zigzag type and has a plurality of successively opposite opening loops or convolutions 13 and 15 of uniform dimensions.

The spring strip 11 has longitudinally spaced pairs of the adjacent opposed loops 13 and 15 shaped so as to be adapted to be clinched over the flat portions 9 of the adjacent coil springs 5 and thereby hold the latter in their predetermined position. This is accomplished, as can be best seen in Fig. 2, by bending the outer portions of an adjacent pair of the loops 13 and 15 upwardly as indicated at 17. Thus, when the spring strip 11 is applied to the adjacent coil springs 5, the abutting flat portions 9 of the adjacent coil springs 5 will be disposed between the upstanding portions 17 of the adjacent loops 13 and 15. The upstanding portions 17 of these particular loops 13 and 15 can then be clinched over the flat portions 9 of the upper convolutions of the coil springs 5, as indicated at 18, so as to secure the same in their abutting relationship. The pairs of upwardly bent loops 13 and 15 are spaced so as to coincide with the flat portions of the coil springs 5 so that the spring strips 11 will extend the entire length or width of a seat cushion and connect the adjacent rows of coil springs together and provide a continuous top surface, while retaining the resiliency of the springs, which may assume a predetermined desirable contour when loaded.

Figure 3:
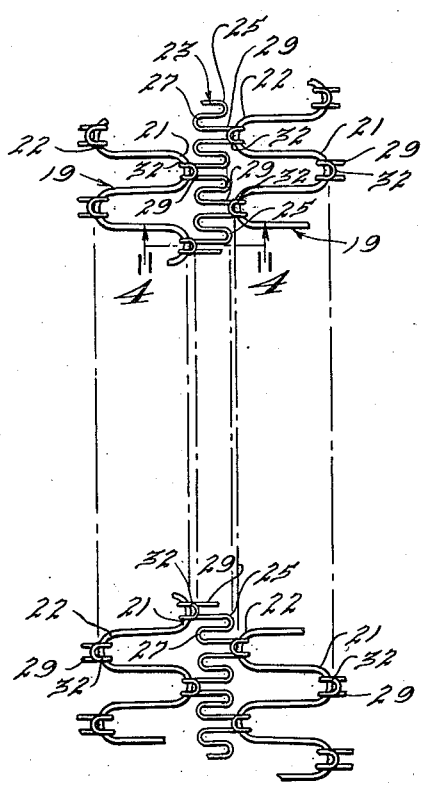
Fig. 3 is an elevational view illustrating a pair of longitudinally elongated zigzag springs interconnected by a zigzag spring strip of this invention.
Figure 4:
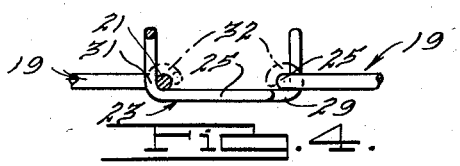
Fig. 4 is an enlarged view partially in section and partially in elevation of the structure illustrated in Fig. 3, taken along the line 4—4 thereof.

In the embodiment illustrated in Figs. 3 and 4, a pair of zigzag type wire springs 19 are illustrated which are disposed in side-by-side spaced relationship and may form a portion of the spring assembly of a seat construction. The springs 19 are formed with a plurality of successively opposite opening convolutions 21 and 22 in much the same manner as with most zigzag type springs. In order to maintain the springs 19 in their properly spaced relationship and in order to resiliently interconnect the same so as to provide a suitable seat cushion or the like, a sinuous spring strip 23 is disposed between each pair of springs 19 and connected to the convolutions thereof in a manner which will now be described.

The spring strip 23 is of the zigzag type and includes a plurality of successively opposite opening loops 25 and 27. The alternate opposed loops of the spring strip 23 have their outer ends extending beyond the outer ends of the adjacent loops. These alternate loops, which are indicated at 29, have their outer ends bent upwardly at 31 so that the spring strip 23 can be inserted between the springs 19 with the upstanding portions 31 of each of the loops 29 engaging one of the convolutions 21 or 23 of the adjacent springs 19. The upper extremities of the upstanding portions 31 of the loops 29 can then be clinched over the convolutions 23 or 21 of the springs 19 at 32 as illustrated in Fig. 4.

The springs 19 are thus secured together in a spaced relationship by means of the resilient springs 23 and as the loops 29 thereof, which are connected to the convolutions 21 and 23 of the springs 19, are laterally extended beyond the remainder of the loops 25 and 27, there will be no rubbing or other interference between the spring convolutions 21 and 23 and the spring strip loops 27 and 25. It will thus be appreciated that the convolutions of the main zigzag springs 19 have been resiliently interconnected by means of the spring strips 23 in a relatively simple and inexpensive manner, so as to provide a continuous top surface, while retaining the resiliency of the springs, which may assume a predetermined desirable contour when loaded.

Thus the two embodiments of this invention, namely, the one shown in Figs. 1 and 2 and the one shown in Figs. 3 and 4, illustrate zigzag spring strips resiliently securing together both coil and zigzag type of spring assemblies, so as to hold the springs in a desired relationship with respect to each other in order to provide as comfortable a spring seat construction as possible.

What is claimed is:

1. A sinuous spring wire strip for connecting springs into groups including successively opposite open loops lying in substantially the same plane with the adjacent loops aligned at each side of the strip along the entire length thereof, said strip having the outer ends of the alternate opposed loops thereof extending laterally beyond the outer ends of the adjacent loops, the outer ends of said alternate loops extending angularly away from said plane and being adapted to engage portions of springs to be connected, whereby the extremities of said outer loop ends can be bent or clinched over said spring portions and thereby connect said springs.

2. A sinuous wire strip for connecting springs into groups including a wire bent back and forth into sinuous form to have central straight portions joined by loop end portions, sections of said strips having adjacent loop portions being separated by alternate oppositely presenting intermediate loops with the straight portions thereof longer than those of the adjacent loops, the ends of the loops of the sections being aligned throughout the length of the strip, the outer ends of said intermediate loops being disposed at an angle to the plane of the strip in position to engage and connect the springs together.

HENRY HOPKES.

References Cited in the file of this patent

UNITED STATES PATENTS

| Number | Name | Date |
| --- | --- | --- |
| 1,302,119 | Young | Apr. 29, 1919 |
| 1,860,699 | Zimmerman | May 31, 1932 |
| 1,920,176 | Atwood | Aug. 1, 1933 |
| 2,002,080 | Dietrich | May 21, 1935 |
| 2,134,371 | Nachman | Oct. 25, 1938 |
| 2,242,919 | Nachman et al. | May 20, 1941 |
| 2,256,158 | Weisbender | Sept. 16, 1941 |
| 2,319,684 | Horton | May 18, 1943 |
| 2,433,418 | Bloch | Dec. 30, 1947 |